Figure 1:
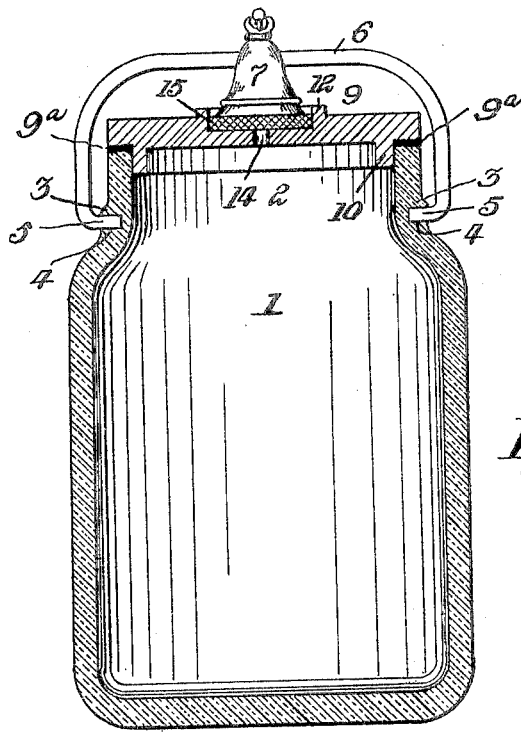

No. 804,574. PATENTED NOV. 14, 1905.
T. BEATTY.
JAR CLOSURE.
APPLICATION FILED JUNE 17, 1905.

Witnesses.
E. A. Rudolph.
H. H. Butler.

Inventor
Thomas Beatty.
By N. C. Everts &co
Attorneys.

UNITED STATES PATENT OFFICE.

THOMAS BEATTY, OF WASHINGTON, PENNSYLVANIA.

JAR-CLOSURE.

No. 804,574.  Specification of Letters Patent.  Patented Nov. 14, 1905.

Application filed June 17, 1905. Serial No. 265,716.

*To all whom it may concern:*

Be it known that I, THOMAS BEATTY, a citizen of the United States of America, residing at Washington, in the county of Washington and State of Pennsylvania, have invented certain new and useful Improvements in Jar-Closures, of which the following is a specification, reference being had therein to the accompanying drawings.

This invention relates to certain new and useful improvements in jar-closures, and relates more particularly to a novel form of lid employed for closing jars.

The primary object of the invention is to provide novel means for hermetically sealing a lid upon a jar, whereby the contents of the jar cannot be affected by atmospheric conditions surrounding the same.

My invention aims to provide a jar having a suitable bail, said bail being adapted to be used for carrying a jar when the same is not being used in connection with a lid. The jar in this instance can be readily used as a receptacle for various household purposes. In connection with the bail I employ novel means for retaining a lid upon a jar, the bail serving functionally as a lever for forcing a lid into engagement with the jar.

To this end I have constructed a household article which is particularly adapted to be used as a receptacle for preserves which are to be hermetically sealed for storage purposes. A jar made of pottery-ware or vitreous material is employed in connection with a lid which is adapted to fit snugly upon the jar. The lid of the jar is provided with a suitable opening, through which gases or vapors arising from the contents of the jar may escape when the jar has been filled, and I provide the jar with a suitable bail and closure for hermetically sealing the opening of the lid when the contents of the jar or receptacle are to be kept for a period of time.

The above construction will be hereinafter more fully described and then specifically pointed out in the claims, and referring to the drawings accompanying this application like numerals of reference designate corresponding parts throughout the several views, in which—

Figure 2:
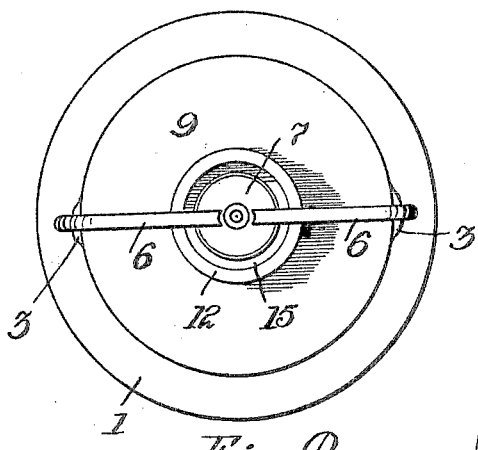
Figure 3:
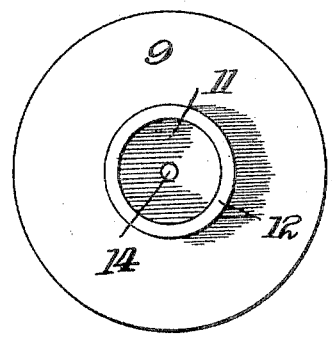
Figure 4:
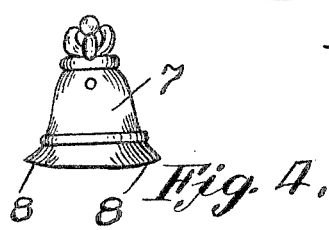

Figure 1 is a vertical sectional view of a jar constructed in accordance with my invention. Fig. 2 is a top plan view of the same. Fig. 3 is a top plan of a lid used in connection with the jar, and Fig. 4 is a detail elevation of a locking or cam member used in connection with the jar for securing a lid thereon.

To put my invention into practice, I employ a jar 1, which, as heretofore stated, is made of pottery-ware or vitreous material, the jar in its contour conforming to the type of jar commonly known as a "Mason" jar. The neck portion 2 of the jar is provided with diametrically-opposed bosses 3 3, having recesses 4 4 formed therein to accommodate the inwardly-bent ends 5 5 of a bail 6. This bail is made of a sufficient height to clear the top of the jar, and centrally of the bail I mount a locking or cam member 7, said member being substantially bell-shaped. The bottom of the member is provided with beveled or cam surfaces 8 8, and I preferably ornament the member, as illustrated in Fig. 4, whereby it will present a neat and attractive appearance. In this connection I do not care to confine myself to the design or ornamentation that I may use in connection with the member.

The reference-numeral 9 designates a lid having a depending annular flange 10, which is adapted to fit within the neck 2 of the jar. Centrally of the top of the lid I provide a circular recess 11, which is surrounded by a rib or flange 12. Centrally of the recess I provide a vertically-disposed aperture 14, which places the interior of the jar in communication with the exterior of the jar when a lid is placed thereon.

In order that the vertically-disposed aperture or opening 14 may be closed, I employ a resilient washer 15, which is preferably constructed of rubber. This washer is adapted to seat in the recess 11 and be retained therein by the locking or cam member 7.

After the jar has been filled and the lid 9 placed in position upon the jar the resilient washer is placed in the seat 11 and the bail 6 moved upwardly over the top of the lid until the member 7 is in close proximity to the washer 15, at which time the member can be forced inwardly upon the washer to retain it over the opening 14. In practice the washer 15 is made of a sufficient thickness that in order for the member 7 to assume a vertical position over the washer it is necessary that said washer be slightly compressed, and the compressing of the washer by the member 7 firmly seals the opening 14 of the lid.

By providing the lid 9 with an opening gases or vapors arising from the contents of the jar or receptacle can be permitted to escape by simply removing the member 7 and the washer, after which it can be again sealed. In some instances it may be desirable to create a vacuum within the jar after it had been partially filled, and a suitable pump may be used in connection with the jar to remove the air from the interior thereof, and after the vacuum has been created the washer can be locked over the opening by the locking or cam member 7.

In connection with the lid 9 I may employ a conventional form of gasket 9ª to form an air-tight connection between the lid and the receptacle or jar.

It will be observed also that the bail 6 provides suitable means for conveniently handling the jar after it has been filled, and it is thought from the foregoing that the construction, operation, and advantages of the herein-described jar-closure will be apparent without further description, and various changes in the form, proportion, and minor details of construction may be resorted to without departing from the spirit of the invention or sacrificing any of the advantages thereof.

What I claim, and desire to secure by Letters Patent, is—

1. The combination with a jar having a suitable lid, of a one-piece bail carried by said jar, a substantially bell-shaped locking cam member mounted centrally of said bail, the top of said lid having a recess formed centrally therein, said lid having an aperture formed centrally of said recess, a resilient washer adapted to seat in said recess and be retained therein by said cam member, substantially as described.

2. The combination with a receptacle having a suitable lid, said lid having a circular recess and an opening formed centrally therein, and a resilient washer adapted to fit over said opening, of a bail carried by said receptacle, a substantially bell-shaped cam member pivotally mounted upon said bail and adapted to engage said washer, substantially as described.

In testimony whereof I affix my signature in the presence of two witnesses.

THOMAS BEATTY.

Witnesses:
 H. B. Hughes,
 B. G. Hughes.